(12) United States Patent
Johnson

(10) Patent No.: US 6,266,739 B1
(45) Date of Patent: *Jul. 24, 2001

(54) METHOD AND APPARATUS FOR ULTRA HIGH-SPEED FORMATTING OF A DISK DRIVE VOLUME

(75) Inventor: Donald W. Johnson, Louisville, CO (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,453

(22) Filed: Feb. 12, 1998

(51) Int. Cl.[7] ................................................. G06F 12/00
(52) U.S. Cl. .................................................... 711/112
(58) Field of Search ............................... 711/6, 112, 203, 711/206, 207

(56) References Cited

U.S. PATENT DOCUMENTS 4,916,608 * 4/1990 Shultz .................................. 709/104
5,095,420 * 3/1992 Eilert et al. ..
5,206,939 * 4/1993 Yanai et al. ............................... 711/4
5,394,532 * 2/1995 Belsan ................................... 711/114
5,787,493 * 7/1998 Niijima et al. ........................ 711/204

\* cited by examiner

Primary Examiner—Matthew Kim
Assistant Examiner—Christian P. Chace
(74) Attorney, Agent, or Firm—Ohlandt, Greeley, Ruggiero & Perle, LLP; Noreen A. Krall, Esq.

(57) ABSTRACT

A method for deriving format data for a functional disk drive volume includes the following steps. Initially format data is written onto a reference functional disk drive volume. A reference functional volume format data structure is then established which associates reference functional volume functional track values with physical track addresses for each track of the functional volume for which the format data was written. Thereafter, when a command is received to format a new functional volume, a copy of the reference functional volume format data structure is derived. Then, when a write command, for example, directed to a track of the new functional volume is received, the copy of the reference functional volume format data structure is used to access a corresponding formatted track from the reference physical disk drive volume. If a write action is then performed on the corresponding formatted track, the updated track is then written back to a physical disk drive at a new location.

16 Claims, 3 Drawing Sheets

METHOD AND APPARATUS FOR ULTRA HIGH-SPEED FORMATTING OF A DISK DRIVE VOLUME

FIELD OF THE INVENTION

This invention relates to a method and apparatus for formatting of disk drive systems and, more particularly, to an ultra high speed method for formatting such disk drive systems.

BACKGROUND OF THE INVENTION

A primary function of a disk drive subsystem is to store data. Many host operating systems incorporate data access methods that require disk volumes to be initialized with a specific number of data records and a specific data content. The process of initializing a disk volume is called formatting and is generally performed by a format utility under control of a central processing unit.

Operating systems employ software utilities to format disk drive volumes, with many utilizing the count, key, data (CKD) format protocol. Such formatting actions can consume a substantial amount of time and processor resources. For example, although each formatted disk track contains the same information and predictable count fields, the format utility must write the CKD information on every track to be formatted. Such write actions require the use of the central processing unit resources, channel resources and disk subsystem resources. As the writing of data to a disk track is a slow process, such formatting is a substantial time-consuming function. For example, an IBM S/390 format utility can take as long as 20 minutes to format an IBM 3390 Model 3 Disk Volume.

The IBM RAMAC (IBM and RAMAC are trademarks of the International Business Machines Corporation) virtual array storage subsystem employs a virtual storage architecture in which functional volumes (i.e., virtual storage volumes) are represented as a set of pointers in tables. The IBM RAMAC system employs an operation called "Snap-Shot" wherein new views of a functional disk volume or data set are "snapped" by copying the pointers. None of the actual data is accessed, read, copied or moved.

To enable the operation of the SnapShot action, a log-structured file procedure is employed wherein updates to data are never done in place on the disk drives. More specifically, any updates that are made to the data are effective only for a particular view of the data and the other views remain unchanged. A log structured array functions as a true log file, in that only the last entry is valid. Thus, when a functional volume track is updated, the current updated copy is always written to the end of the log file, creating a gap in the disk system called "free space" which is recovered in a later action. Accordingly, when the RAMAC system updates a view of a functional volume, that update is written to a new location and the log of that view is then caused to reflect the new updated data location. The other views of the data remain the same and the pointers point to the pre-update version of the data.

Notwithstanding the speed of the data duplication action which results from a virtual array storage subsystem function, the formatting of a functional disk volume that is required by some host data access methods still requires the expenditure of large amounts of time and system resources.

Accordingly, it is an object of this invention to provide an improved method and apparatus for formatting a functional disk volume.

It is another object of this invention to provide an improved method and apparatus for formatting a functional disk volume which provides substantial speed advantages over prior art format utilities.

SUMMARY OF THE INVENTION

A method for deriving format data for a functional disk drive volume includes the following steps. Initially format data is written onto a reference functional disk drive volume. A reference functional volume format data structure is then established which associates reference functional volume functional track values with physical track addresses for each track of the functional volume for which the format data was written. Thereafter, when a command is received to format a new functional volume, a copy of the reference functional volume format data structure is derived. Then, when a write command, for example, directed to a track of the new functional volume is received, the copy of the reference functional volume format data structure is used to access a corresponding formatted track from the reference physical disk drive volume. If a write action is then performed on the corresponding formatted track, the updated track is then written back to a physical disk drive at a new location.

DETAILED DESCRIPTION OF THE INVENTION

Figure 1:
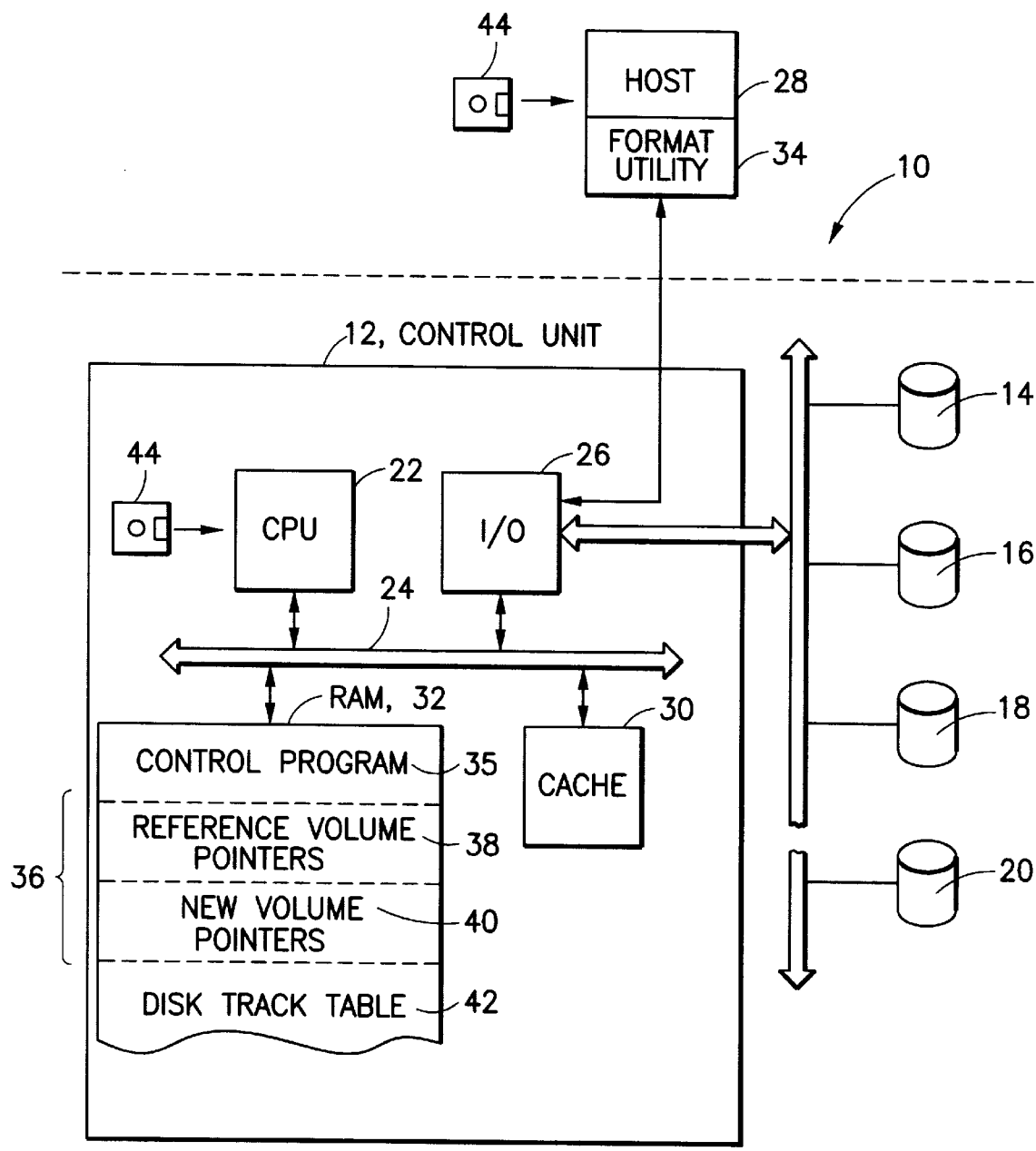
FIG. 1 is a block diagram of a system that is adapted to perform the method of the invention.

Referring now to FIG. 1, a disk subsystem 10 includes a control unit 12 and a plurality of physical disk drives 14, 16, 20, etc. Control unit 12 includes a central processing unit (CPU) 22 which communicates with other elements of control unit 12, via a bus system 24. An input/output module 26 is coupled to bus system 24 and provides a communication interface for control unit 12 with a host computer 28 and physical disk drives 14, 16, 18 and 20. A format utility 34 present in host 28 provides a format action for functional disk volumes contained within a functional track field 36. A cache memory 30 is coupled to bus system 24 and provides an intermediate, high-speed memory repository for track data that is being updated.

A random access memory (RAM) 32 includes, amongst other data, a plurality of programs and data structures that are required for operation of the invention. Control program 35 provides overall control of control unit 12 in conjunction with CPU 22. A functional track table 36 includes a reference functional volume pointers region 38 which includes one pointer for each track of a reference functional volume, each pointer indicating an address in a disk track table 42 wherein a physical track address is stored for one of the disk drives 14, etc. Functional track table 36 further includes a new functional volume pointers region 40 which is a duplicate of reference functional volume pointers region 38, as will be understood from the description below.

While the following discussion will assume that each of the procedures, programs and data structures shown in RAM 32 are already loaded thereinto, it is to be understood that each thereof can be contained on one or more storage devices such as disk media 44 and downloaded therefrom into CPU 22 for execution.

Figure 2:
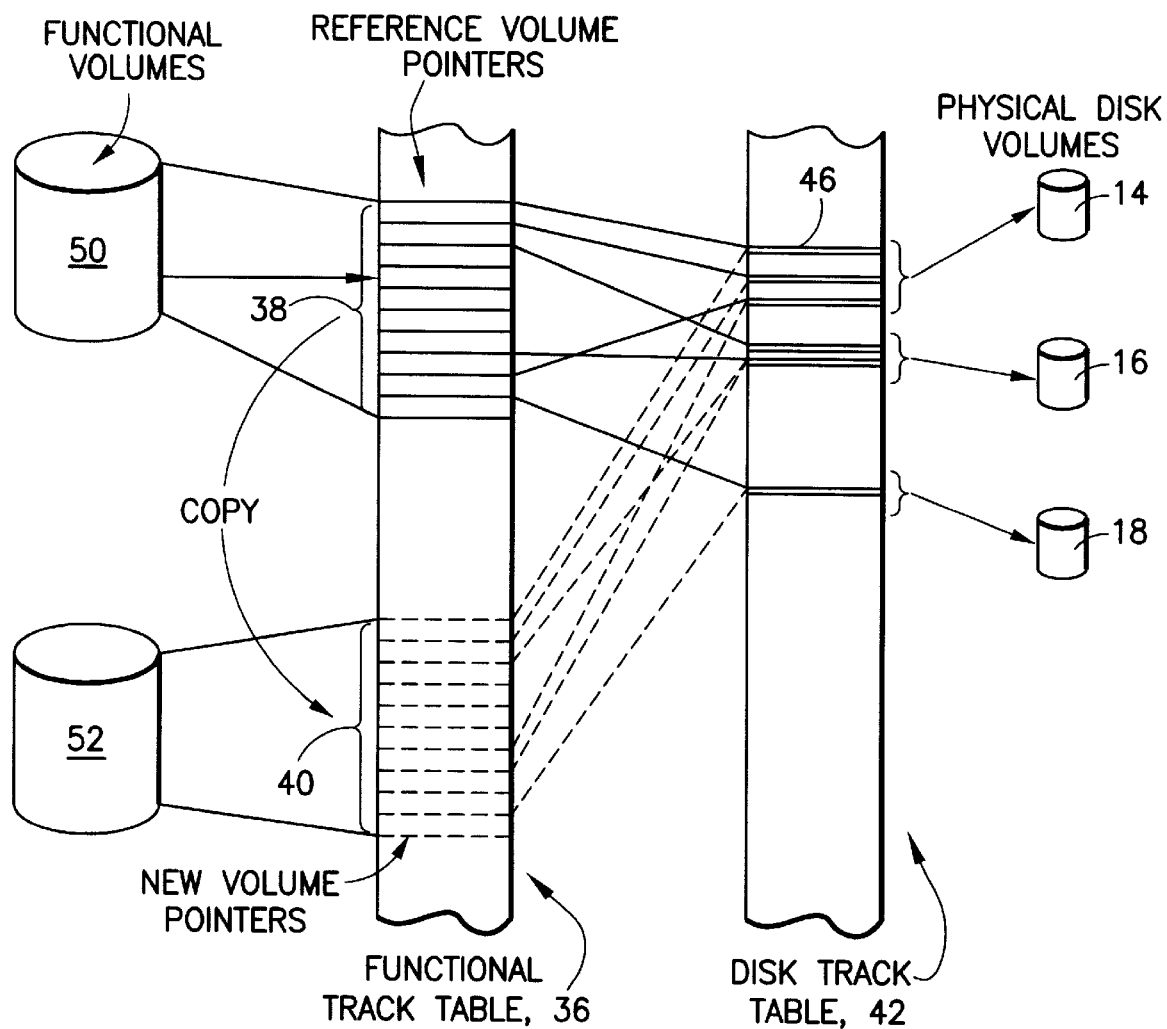
FIG. 2 is a further schematic block diagram helpful in understanding the operation of the invention.

Referring now to FIG. 2, the operation of the invention will be described in conjunction therewith and the flow diagram of FIG. 3. Initially, prior to any requirement to format a new disk drive volume, host 28 executes format utility 34 to format a reference functional (i.e., virtual) volume (step 100). In response, control unit 12 receives format write commands from host 28 to initialize data records on functional volume 50 for every track identified to host format utility 34. Immediately afterwards, the derived formatting data is likewise written to a reference physical disk volume, e.g., physical disk drive 14. More specifically, each track of reference physical disk drive 14 has count, key and data fields written thereinto.

At this point, CPU 22 is operated by control program 35 to cause the writing into functional track table 36 of a set of a reference volume pointers 38 that each, individually, points to an address in disk track table 42 wherein a particular physical disk track address 46 on reference disk drive 14 is stored. The respective physical disk track address identifies where the physical data is located that is indicated by the reference volume track pointer. Each physical disk track address 46 designates a physical track in reference disk volume 14.

Figure 3:
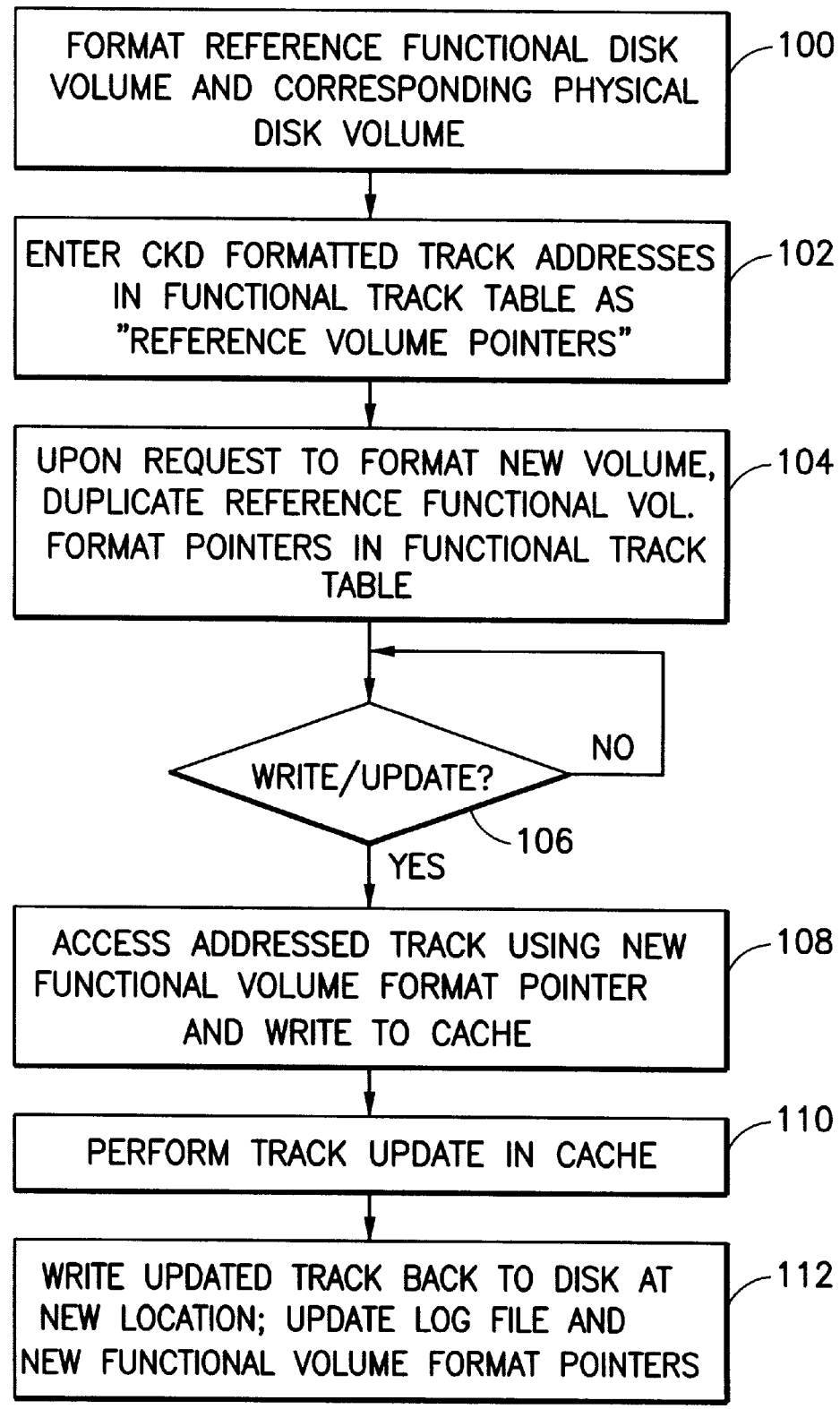
FIG. 3 is a logical flow diagram illustrating the method of the invention.

Accordingly, once reference volume pointers 38 have been entered into functional track table 36, access can be had to any formatted track on reference disk volume 14 by simply accessing the reference volume pointer (step 102, FIG. 3).

Thereafter, when a request is received to format a new disk volume/track, the reference functional volume pointers 38 are duplicated as a set of new functional volume pointers 40 in functional track table 36 (step 104). At this point, there are two identical sets of pointers to physical disk track table 42, the corresponding entries in both of which point to identical physical track addresses 46.

Next, as shown in decision step 106, until a write/update command is received, the procedure recycles and waits. Upon receiving a write/update command designating a particular track of a new functional disk volume (e.g., functional disk volume 52) to be written into, control program 35 causes CPU 22 to access the addressed (pre-formatted) track by utilizing a new volume format pointer for a physical track corresponding to the addressed track. The new volume pointer 40 enables a physical track address 46 to be accessed from disk track table 42. Thereafter, using the accessed physical track address, the corresponding physical track is read from the addressed location in physical disk drive volume 14 and is written to cache memory 30 (FIG. 1) in order to enable the update action to be accomplished (step 108).

At this stage, a formatted track has been obtained from reference physical disk volume 14 and written into cache memory 30, without requiring a format action to be carried out with respect to functional volume 52. Thereafter, CPU 22, under control of control program 35, updates the track data contained in cache 30, in accordance with data received from host processor 28 (step 110). Then, control program 35 causes CPU 22 to select a new physical track (e.g. in disk volume 16) and writes the updated track data thereinto. Concurrently, the new volume pointer in functional track table 36 is updated to point to the address in disk track table 42 which contains the physical track address of the updated track in physical disk volume 16 (step 112).

Thereafter, reference functional disk volume 50 is maintained as the reference functional volume for future formatting actions and, as each track thereof is accessed for format purposes, the resulting updated data in the accessed track is written to a new disk track so as to enable reuse of the format track within physical disk volume 14. Accordingly, subsequent format actions can be accomplished, substantially instantaneously, without requiring further execution of format utility 34.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for deriving format data for a disk drive volume, comprising the steps of:

a) establishing a formatted reference functional disk volume comprising one or more memory regions, each memory region reproducing a track volume corresponding to a disk track and including format data for said disk track and writing said format data onto a reference physical disk drive volume;

b) establishing a reference format data structure which associates functional track values of said formatted reference functional disk volume with physical track addresses for said reference physical disk drive volume into which said format data was written;

c) responding to a command to format a new functional disk drive volume by deriving a copy of said reference format data structure for said new functional disk drive volume;and d) repeating step c) in response to each subsequent command to format another new functional disk drive volume.

2. The method as recited in claim 1, further comprising the steps of:

e) responding to a write command directed to a track of said new functional disk drive volume, by employing said copy of said reference format data structure to access a corresponding formatted track from said reference physical disk drive volume and performing an update action to data contained in said corresponding formatted track; and f) writing said corresponding formatted track with data that has been updated onto a track of a new physical disk drive volume and updating, accordingly, said copy of said reference format data structure.

3. The method as recited in claim 1, wherein said reference format data structure relates functional track addresses to addresses in a disk track table which contains physical track addresses that correspond to said functional track addresses.

4. The method as recited in claim 2, wherein step f) writes said corresponding formatted track onto a track of said new physical disk drive volume and revises a functional track address thereof to reflect a new physical track address in said new functional disk drive volume.

5. The method as recited in claim 2, wherein step f) is inhibited from writing said formatted track with data that has been updated onto a track of said reference physical disk drive volume to enable said formatted reference physical disk drive volume and/or said reference format data structure is to be retained for future rapid formatting actions for other new functional disk volumes.

6. A memory media for controlling a computer to derive format data for a disk drive volume, said memory media comprising:

a) means for controlling said computer to establish a formatted reference functional disk volume comprising one or more memory regions, each memory region reproducing a track volume corresponding to a disk track and including format data for said disk track and to write said format data onto a reference physical disk drive volume;

b) means for controlling said computer to establish a reference format data structure which associates functional track values of said formatted functional disk volume with physical track addresses for said reference physical disk drive volume into which said format data was written; and c) means for controlling said computer to respond to a command to format a new functional disk drive volume by deriving a copy of said reference format data structure for said new functional disk drive volume and to respond to each subsequent command to format another new functional disk drive volume to derive another copy of said reference format data structure therefor.

7. The memory media as recited in claim 6, further comprising d) means for controlling said computer to respond to a write command directed to a track of said new functional disk drive volume, by employing said copy of said reference format data structure to access a corresponding formatted track from said reference physical disk drive volume and to perform an update action to data contained in said corresponding formatted track; and e) means for controlling said computer to write said corresponding formatted track with data that has been updated onto a track of a disk drive volume and updating, accordingly, said copy of said reference format data structure.

8. The memory media as recited in claim 6, wherein said reference format data structure relates functional track addresses to addresses in a disk track table which contains physical track addresses that correspond to said functional track addresses.

9. The memory media as recited in claim 7, wherein means e) writes said corresponding formatted track onto a track of a new physical disk drive volume and revises a functional track address thereof to reflect a new physical track address in said new functional disk drive volume.

10. The memory media as recited in claim 7, wherein means e) is inhibited from writing said formatted track with data that has been updated onto a track of said reference physical disk drive volume to enable said formatted reference physical disk drive volume and/or said reference format data structure to be retained for rapid formatting actions for other new functional disk volumes.

11. The memory media as recited in claim 6, wherein means c) uses a fast copy facility to derive said copy of said reference format data structure.

12. The method as recited in claim 1, wherein step c) uses a fast copy facility to derive said copy of said reference format data structure.

13. A method of rapidly formatting a plurality of disk drive volumes, comprising:

a) establishing a formatted reference functional disk drive volume comprising one or more memory regions, each memory region reproducing a track volume corresponding to a disk track and including format data for said disk track;

b) establishing a reference format data structure which associates functional track values of said formatted reference functional disk drive volume with physical track addresses for said reference functional disk drive volume;

c) responding to a format command to format a first disk drive volume of said plurality of disk drive volumes by deriving a first copy of said reference format data structure; and d) responding to each subsequent command to format another disk drive volume of said plurality of disk drive volumes by deriving a another copy of said reference format data structure.

14. The method as recited in claim 13, further comprising:

e) responding to read or write commands directed to a track of (i) said first functional disk drive volume by employing said first copy of said reference format data structure or (ii) each of said other functional disk drive volume by employing a corresponding one of said other copies of said reference format data structure.

15. The method as recited in claim 14, further comprising:

e) updating said first and/or other copies when said read or write commands require a write operation.

16. The method as recited in claim 13, wherein step c) uses a fast copy facility to derive said copy of said reference format data structure.

* * * * *